United States Patent

Palmer et al.

[15] 3,653,613
[45] Apr. 4, 1972

[54] ENERGY ABSORBING DEVICE

[72] Inventors: Roy M. Palmer, South Bend, Ind.; Robert J. Schoenhals, Tempe, Ariz.

[73] Assignee: The Bendix Corporation

[22] Filed: May 8, 1970

[21] Appl. No.: 35,721

[52] U.S. Cl. ..................... 244/103 R, 188/299, 280/124 F
[51] Int. Cl. ................................................. B64c 25/58
[58] Field of Search .............. 244/103, 104, 102, 100, 103 R; 152/333, 415, 416, 417; 280/124 F, DIG. 1; 188/299

[56] References Cited

UNITED STATES PATENTS

| | | | |
|---|---|---|---|
| 2,810,535 | 10/1957 | Albright | 244/104 |
| 3,035,853 | 5/1962 | Klein | 280/124 F |
| 3,124,368 | 3/1964 | Corley et al | 280/DIG. 1 |
| 3,528,679 | 9/1970 | Gant | 152/416 X |

FOREIGN PATENTS OR APPLICATIONS

| | | | |
|---|---|---|---|
| 940,656 | 5/1948 | France | 152/333 |
| 1,273,336 | 7/1968 | Germany | 244/104 |

*Primary Examiner*—Milton Buchler
*Assistant Examiner*—Paul E. Sauberer
*Attorney*—Gordon H. Chenez and Plante, Arens, Hartz, Smith and Thompson

[57] ABSTRACT

An energy absorbing device comprising: an energy absorber, including relatively fixed and telescoping portions; a lever operatively connected to said energy absorber; a wheel, including a pressurized tire rotatably carried on said lever; pressure sensors carried on said wheel for monitoring the pressure in said tire; and means for modifying the energy absorbing characteristics of said energy absorber means in response to signals transmitted from said pressure sensors to minimize the effect of vertical deflections on said energy absorber.

7 Claims, 2 Drawing Figures

PATENTED APR 4 1972 3,653,613

INVENTORS
ROY M. PALMER &
BY ROBERT J. SCHOENHALS

Gordon H. Chevey
AGENT

ENERGY ABSORBING DEVICE

BACKGROUND OF THE INVENTION

This invention relates to an energy absorbing device for use with an aircraft landing gear, and more particularly, to a gear for landing on rough terrain. Theoretical and experimental studies of the problem of landing and taxiing over rough terrain have shown that the conventional shock absorbing mechanisms known in the art are incapable of satisfactorily attenuating loads resulting from bump impact vertical deflections. This is primarily due to the fact that the shock absorbing mechanism is not compatible with the frequencies and mode shapes of the bump impact input. As a result, the shock strut usually acts essentially as a rigid link, stroking only a small amount, where most of the loads are absorbed by the tire and/or transmitted directly to the airframe through the landing gear hard points.

SUMMARY OF THE INVENTION

It is an object of this invention to provide an improved energy absorbing device for use in connection with landing on rough terrain.

It is an object of this invention to provide an improved energy absorbing device that is not impaired during its use on normal landing terrain.

It is an object of this invention to provide an improved energy absorbing device that is adaptable to any conventional type of landing gear system.

It is an object of this invention to provide an energy absorbing device having a pressure device which is sensitive to variations in tire pressure and which upon bump impact will control a valve which in turn will modify the energy absorbing characteristics of the energy absorbing device.

Other objects and features of the invention will be apparent from the accompanying drawings.

DESCRIPTION OF THE PREFERRED EMBODIMENT

Figure 2:
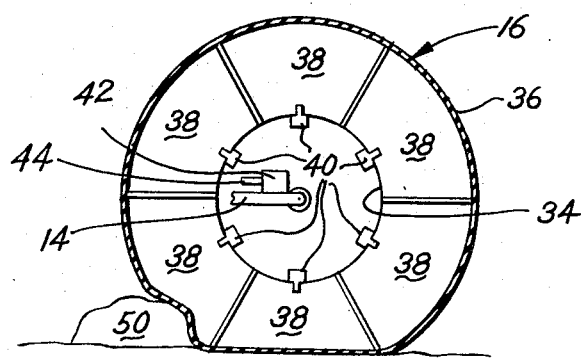
FIG. 2 is a sectional view of the wheel showing the air chambers internal to the tire.
Figure 1:
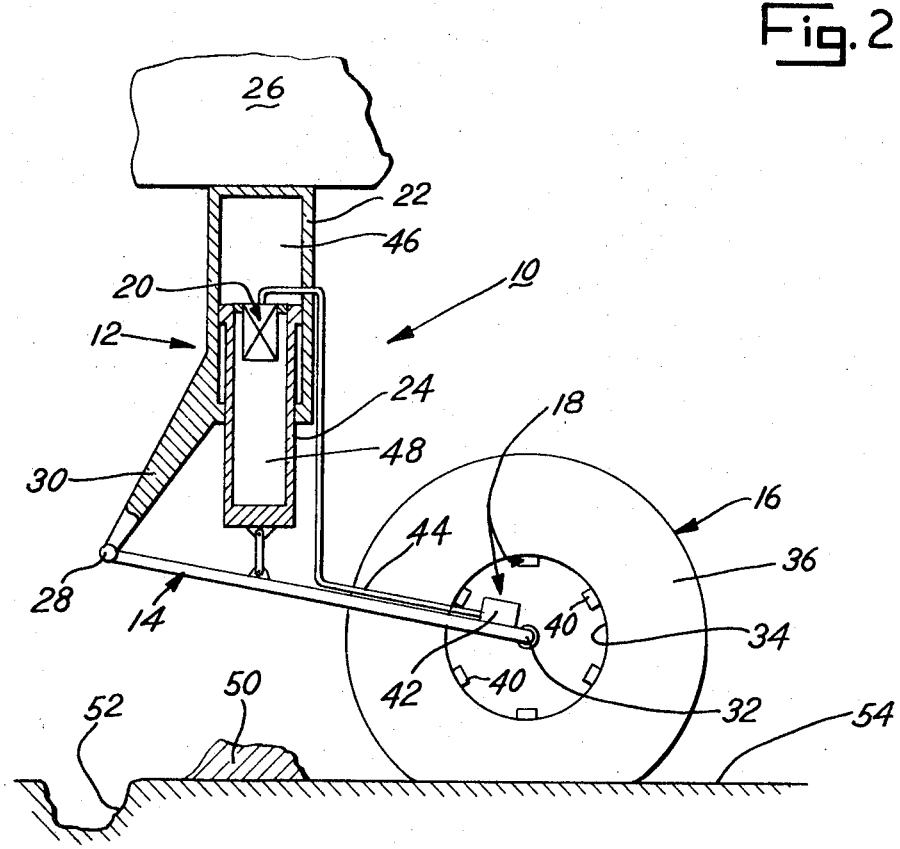
FIG. 1 is a diagrammatic view, partially in section, showing a landing gear arrangement which incorporates the invention.

Referring to FIG. 1, it will be seen that the energy absorbing device, which is indicated generally by the numeral 10, is comprised of an energy absorber 12, a lever 14, a wheel 16, pressure sensing means indicated generally by the numeral 18 and suitable means 20, such as a valve, for modifying the energy absorbing characteristics of the energy absorber 12. The energy absorber 12 is a conventional shock absorber or strut which includes an upper portion 22 and a lower telescoping portion 24. The upper portion 22 is rigidly secured to the frame of the aircraft 26, only a fragmented portion of which is shown. The lever 14 is pivotally connected at 28 to an extended portion 30 of the upper portion 22 of the energy absorber 12. The wheel 16 is rotatably carried at 32 by the lever 14. The wheel 16 is comprised of a rim 34 and a tire 36. The tire 36 is separated into a plurality of independent air tight compartments 38, as shown in FIG. 2.

The pressure sensing means 18 is comprised of a plurality of sensor members 40, a receiver 42 and a conduit 44. The sensor members 40 are mounted so as to project into the interior of each of the compartments 38. Each sensor member 40 includes a portion which is sensitive to pressure changes in its respective compartment, and a suitable battery powered electronic transmitter which has an output signal amplitude directly responsive to the pressure sensitive portion, which in turn is directly responsive to the pressure (or pressure change) in the compartment 38 of the tire 36. Reference is made to pressure transducer type 4–356 manufactured by CEC/Transducer Division, Bell and Howell Co. for an example of one device substantially equivalent to sensor member 40. The receiver 42 is non-rotatably carried on the lever 14 in close proximity to the sensor members 40. The receiver 42 is simultaneously responsive to all of the sensor members 40 and will have an output control signal whose amplitude is equal to the highest amplitude of any of the sensor members 40. Reference is made to Peak Detector Model SA326 manufactured by the Bell and Howell Co. for an example of a commercially available device similar to receiver means 42. The receiver means 42 includes a conduit 44 which communicates the output control signal of the receiver 42 to the valve 20 for control thereof.

The valve 20 has a suitable variable orifice (not shown) for regulating fluid flow from chamber 46 to chamber 48 in response to the control signal from the pressure sensing means 18. With such an arrangement it is possible for the energy absorber 12 to respond more quickly during rough terrain landings than is required on normal terrain landings. Thus, the variability of the orifice of the valve 20 is used to change the response time or the stroking characteristics of the energy absorber 12 during rough terrain landings of the aircraft. Reference is made to U.S. Pat. No. 3,060,684 issued Oct. 30, 1962 to T. H. Holmes which illustrates various fluid pressure actuated valves having variable area orifices which may be adapted for use as valve 20.

MODE OF OPERATION OF THE PREFERRED EMBODIMENT

With the foregoing structural description it will be evident to those skilled in the art that the invention resides in sensing tire compartment pressure changes which occur upon impact with a rock or bump 50, or a hole or rut 52 and utilizing this sensed pressure change to modify the normal damping characteristics of the energy absorber 12 and thereby minimize, if not eliminate, the effect of vertical deflections on the airframe 26.

Assume then that a landing is being made on rough terrain by an aircraft equipped with the energy absorbing device 10. Upon touch-down of the wheel 16 on the generally level portion of the terrain 54, the energy absorbing device 10 would typically be loaded, as shown in FIG. 1. Upon engagement of the tire 36 with the rock 50, as shown in FIG. 2, the air pressure in compartment 38 increases sharply. The sensor member 40 detects this pressure increase and transmits a signal via the receiver 42 and conduit 44 to the valve 20 whereby a change is made in the orifice setting of the valve 20 to allow a rapid stroking of the primary energy absorber 12, as the wheel 16 passes over the rock 50.

While specific details have been herein shown and described, the invention is not confined thereto since other changes and substitutions can be made within the spirit and scope of the invention.

We claim:

1. An energy absorbing device comprising:
   energy absorbing means, including relatively fixed and telescoping portions;
   lever means operatively connected to said energy absorbing means wheel means including a pneumatic tire rotatably mounted on said lever means;
   pressure sensing means carried on said wheel means for monitoring the pressure in said tire; and
   means for modifying the energy absorbing characteristics of said energy absorber means in response to signals transmitted from said pressure sensing means to minimize the effect of vertical deflections on said energy absorber means as said wheel means is subjected to relatively large vertical deflections.

2. An energy absorbing device, as recited in claim 1, wherein said means for modifying the energy absorbing characteristics of said energy absorber means is a valve means.

3. An energy absorbing device, as recited in claim 2, wherein said valve means is responsive to electrical control signals.

4. An energy absorbing device, as recited in claim 3, wherein said pneumatic tire includes a plurality of compartments.

5. An energy absorbing device, as recited in claim 4, wherein said pressure sensing means comprises:
   a sensor member projecting interiorly of at least one of said compartments to sense a change in compartment pressure in response to a bump impact vertical deflection;
   said sensor member converting said pressure change to a control signal; and
   receiver means non-rotatably carried by said lever means in close proximity to said sensor member for receiving said control signal;
   said receiver means including a conduit means for communicating said control signal to said valve means for control of said valve means.

6. An energy absorbing device, as claimed in claim 1, wherein:
   said lever means is pivotally mounted at one end to said fixed portion;
   said wheel means is rotatably mounted on the opposite end of said lever means and adapted to cause pivotal movement of said lever means.

7. An energy absorbing device, as claimed in claim 1, wherein:
   said fixed portion defines a fluid filled first chamber;
   said telescoping portion defines a second chamber having an orifice providing fluid communication with said first chamber and through which fluid is transferred from said first chamber to said second chamber in response to telescoping movement thereof;
   said means for modifying the energy absorbing characteristics of said energy absorbing means including valve means operatively connected to said orifice for varying the effective flow area thereof and means responsive to deformation of said tire resulting from bump impact therewith operatively connected to said valve means for actuating the same.

* * * * *